Figures 3, 4, 5:
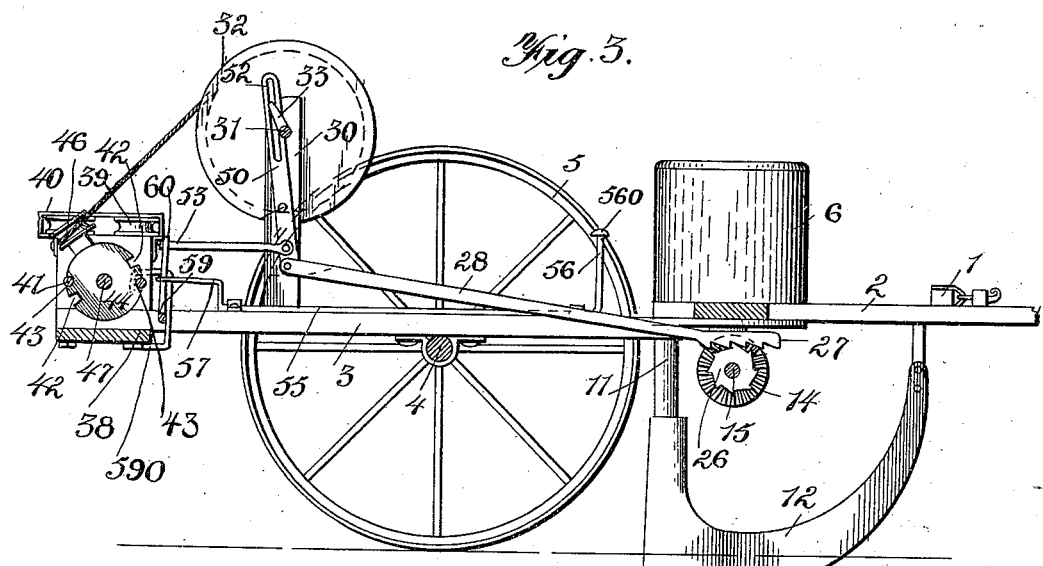

No. 643,042. Patented Feb. 6, 1900.
H. W. CRUMBAUGH.
CHECK ROW ATTACHMENT.
(Application filed Nov. 11, 1899.)
(No Model.) 2 Sheets—Sheet 1.
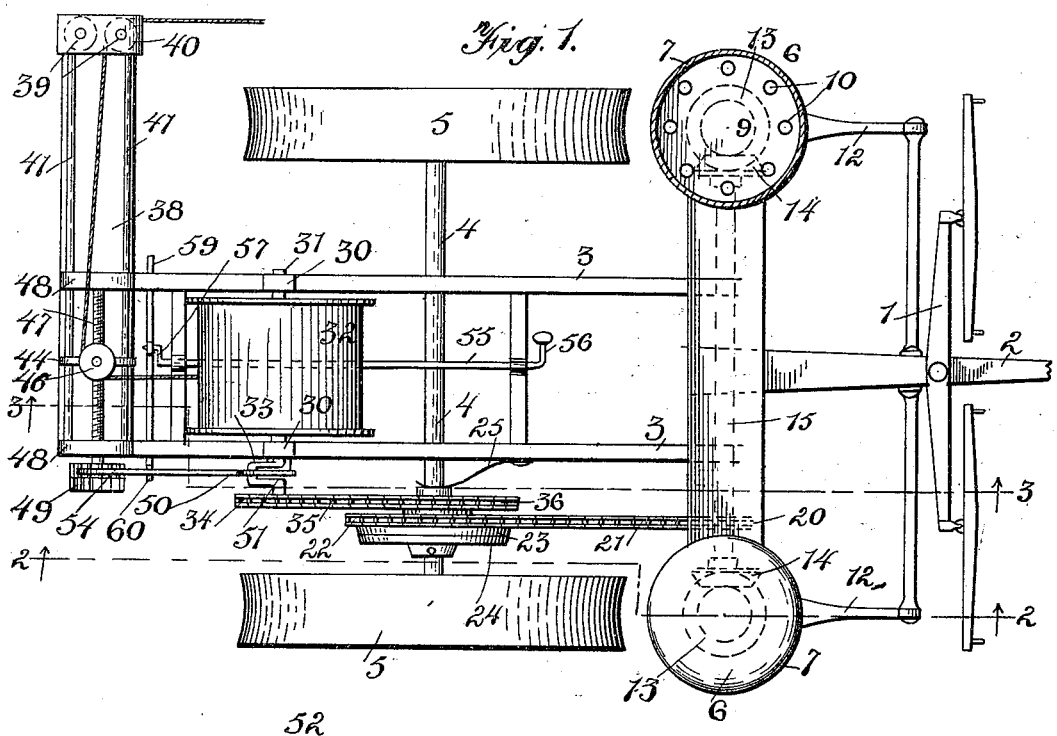
Witnesses:
Geo. E. Frech.
Thos. R. Heath.
Henry W. Crumbaugh, Inventor,
by
Collamer & Co.,
Attorneys.

No. 643,042. Patented Feb. 6, 1900.
H. W. CRUMBAUGH.
CHECK ROW ATTACHMENT.
(Application filed Nov. 11, 1899.)
(No Model.) 2 Sheets—Sheet 2.

Witnesses:
Geo. E. Frech
Thos. R. Feath

Inventor
Henry W. Crumbaugh
by
Collamer & Co.,
Attorneys

UNITED STATES PATENT OFFICE.

HENRY W. CRUMBAUGH, OF PITTSBURG, ILLINOIS.

CHECK-ROW ATTACHMENT.

SPECIFICATION forming part of Letters Patent No. 643,042, dated February 6, 1900.

Application filed November 11, 1899. Serial No. 736,638. (No model.)

*To all whom it may concern:*

Be it known that I, HENRY W. CRUMBAUGH, a citizen of the United States, and a resident of Pittsburg, Fayette county, State of Illinois, have invented certain new and useful Improvements in Check-Row Attachments; and my preferred manner of carrying out the invention is set forth in the following full, clear, and exact description, terminating with claims particularly specifying the novelty.

This invention relates to seeders and droppers, and more especially to that class thereof known as "check-row;" and the object of the same is to produce the dropping of the seed at regular intervals by the use of a smooth wire, line, or cable, which is wound upon a drum carried by the machine as the latter progresses across the field in one direction and which is unwound therefrom as the machine returns.

To this end the invention consists in a machine embodying this general idea as well as in the preferred details of construction for carrying it out, all as hereinafter more fully described and claimed and as illustrated in the accompanying drawings, wherein—

Figure 1 is a plan view of this machine entire. Fig. 2 is a section on the line 2 2 of Fig. 1. Fig. 3 is a section on the line 3 3 of Fig. 1, showing slightly-different means for actuating the seed-droppers and illustrating the foot-lever. Fig. 4 is an enlarged detail of the preferred form of pulley-frame and the device for spreading the wire evenly on the drum. Fig. 5 is a detail of the foot-lever for shifting the direction of the feed.

Referring to the said drawings, 1 is the whiffletree, mounted on a tongue 2, which is connected with the frame 3, wherein is journaled the main axle 4, having rigidly secured to its extremities the supporting-wheels 5. The latter travel in rear of the seed-droppers 6, mounted on the frame and which may be of any preferred construction, one of which is shown in Fig. 2. A cylindrical hopper or casing 7 has a hole 8 in its bottom, and pivoted axially to the latter is a plate 9 with a series of holes 10, which register intermittently with that numbered 8. As each one registers the seed within the hole 8 drops through the tube 11 in rear of the shoe 12 and falls into the furrow made by the latter, which furrow is closed by the wheel 5 in passing over it. In the present instance the rotary plates 9 carry bevel-gears 13, intermeshing with others numbered 14 at the extremities of a shaft 15, journaled across the frame, whereby the two seed-feeding devices are actuated simultaneously.

While any suitable means may be employed for actuating the shaft 15 either continuously or intermittently, I have illustrated but two herein.

In Fig. 1, 20 is a sprocket-wheel mounted on the shaft 15 and connected by a belt 21 with another sprocket-wheel 22, mounted loosely on the main axle 4 and having a hub 23, smooth on its outer face, which stands adjacent a disk 24, that is fast on said axle, and 25 is a spring bearing against the inner end of the hub of the wheel 22, so as to press the latter normally into frictional contact with the disk. This causes the continuous rotation of the shaft 15, as will be clear. The other form (best seen in Fig. 3) consists of a ratchet-wheel 26, mounted on the shaft 15 and engaged by teeth 27 at the forward end of a rod 28, which leads to the rear and is reciprocated in a manner hereinafter described, whereby the shaft 15 is given an intermittent rotary movement with the same result as to the dropping of the seed.

Rising from the main frame 3 is a support 30, wherein is journaled the shaft 31 of a drum 32, which shaft is cranked, as at 33, and carries a sprocket-wheel 34, connected by a belt 35 with another sprocket-wheel 36, which is secured rigidly to the inner side of the sprocket-wheel 22 on the main axle above described, and which is therefore subject to the pressure of the spring 25, whereby it is driven by the friction-clutch, as above set forth. At its rear the main frame 3 carries a pulley-frame 38, which projects laterally beyond the line of one of the main wheels 5, and at its outer end carries a pair of grooved pulleys 39, preferably located within a housing 40.

The operation of the device as thus far described will be as follows: The check-row wire, line, or cable is rigidly attached to a stake at one side of the field, across which latter it is to be led, and it is then passed between the pulleys 39 around a suitable feed-pulley (yet to be described) and led to the drum. The driver taking his seat and starting up the horses, the friction-clutch permits the unwinding wire to cause the drum to rotate reversely at just the proper speed to unwind the wire from its periphery as the machine progresses, and meanwhile the shaft 15 is rotated, so as to drill the seeds. Having traveled across the field and unwound all the wire, the operator turns the machine completely around, so as to bring him into position for the next two rows to be drilled, and then he drives back across the field. The wire being at this time off the drum, his return naturally requires the rewinding of the wire and the forcible rotation of the drum in the opposite direction. This is caused by sprocket 36 and friction-clutch, the spring 25 having first been tightened and the direction of feed of the spreader (see below) reversed, and the rotation of the drum drills the two new rows as desired. Arriving at the point of starting, the operation is repeated, but before repeating it the stake is set forward the space of four new rows. Thus it will be seen that progress in one direction causes the stake to unwind the wire, while progress in the other direction rewinds it on the drum, either of which rotates the shaft 15 and results in planting the seed.

It will be obvious that the machine might not operate accurately, as above described, if the wire, line, or cable while being wound upon the drum should not be spread evenly, for if it banked up at one spot the circumference of the drum would be so much increased there that it would wind more rapidly as the stake was approached. True, the friction-clutch would permit some slipping, but it is not desirable that this should take place as the machine progresses in both directions. Hence it becomes necessary to use some form of spreader for feeding the wire to the surface of the drum, so that it shall be wound thereon in convolutions which lie against each other.

While any suitable form of spreading device may be employed or while the spreading might be done by the hand or the foot of the driver, I prefer to use the mechanism described below.

The pulley-frame 38 (best seen in Fig. 4) is preferably composed of two parallel rods 41, mounted on the frame itself and extending from the pulleys 39 inward, and these rods are engaged by opposite notches 42 42 or 43 43 in the edge of a disk 44, carrying a spindle 45, whereon is journaled a feed-wheel 46. When the notches 42 engage the rods, the spindle 45 is upright and the wheel 46 feeds the wire to the bottom of the drum; but when the disk is turned, so that the other notches 43 engage the rods 41, the spindle, which is the axis of the feed-wheel, is inclined and the wire is fed to the top of the drum.

47 is a screw mounted in bearings 48 on the frame 38 and threaded through the disk 44, and one end of this screw carries fast thereon a pair of oppositely-facing ratchet-wheels 49.

50 is a lever pivoted at 51 to any suitable support, such as 30, and having a slotted upper end 52, which loosely engages the crank 33 of the drum-shaft 31, and to this lever is connected a rod 53, having teeth 54. The latter are so shaped as to work in conjunction with either of the ratchet-wheels 49, according to which one they engage. It will be clear that the rocking of the lever by means of the crank 33 will reciprocate the rod 53, and to this lever is also attached the rod 28, above described, (if this rod is used,) whose reciprocation turns the shaft 15 and discharges the seed, as explained.

Any suitable means may be used for shifting the teeth 54 from one ratchet-wheel 49 to the other, but I preferably employ the foot-lever. (Best seen in Figs. 3 and 5.) This consists of a rock-shaft 55, journaled in suitable supports on the main frame and having an upturned foot-piece 56, weighted, as at 560, or this piece might be longer, so as to be operated by hand, if desired. The shaft is cranked, as at 57, and engages an eye 58 in a rod 59, which has a fork 60 or is otherwise connected with the free end of the rod 53. Throwing the foot-piece 56 in one direction engages the teeth 54 with one of the ratchet-wheels 49, after which the movement of the lever turns the screw in a direction to cause the feed-wheel to travel toward one of the bearings 48, and throwing the foot-piece 56 in the opposite direction has the reverse effect. It will be clear that this change of direction in the feed will not affect the reciprocating movement of the rod 28, if employed. The rod 59 carries at suitable points two stops 590, so shaped as to engage one or both of the rods 41, and possibly also the base 38 of the pulley-frame, and these stops are located in such positions that when the disk 44 approaches one end of the screw 47 it will engage one stop, move the rod 59, swing the weighted foot-piece 56, and cause the fork 60 to shift the rod 53 from one of the ratchet-wheels 49 to the other. Thus the direction of rotation of the screw is automatically reversed, the nut travels back along the screw and spreads the wire upon the drum, and near the other end of the screw the remaining stop is engaged and the direction of rotation again reversed. It will be clear that this mechanical reverser acts automatically to spread the wire evenly, yet permits the operator to reverse by means of the foot-piece whenever desired.

What is claimed as new is—

1. In a checking attachment, the combination with the framework carrying the seed-droppers, a drum supported by the framework and connected with the seed-droppers for actuating the latter, and a smooth wire secured to some fixed device and led over pulleys to the drum; of a gear-wheel mounted loosely on the main axle and connected with the drum, and a friction-clutch between said gear-wheel and axle, the parts being arranged and proportioned so as to wind the wire on the drum as the machine approaches said fixed device and to permit the drum to rotate oppositely as the machine recedes from this device, as and for the purpose described.

2. In a checking attachment, the combination with the framework mounted on main supporting-wheels connected by a rotating axle, a pair of seed-droppers operated in unison by a cross-shaft, a drum carried by the framework, and connections between the shaft of the drum and said cross-shaft for operating the seed-droppers; of a sprocket-wheel loose on the axle and belted to another sprocket on the shaft of the drum, a disk fast on the axle adjacent the hub of said loose sprocket, a spring pressing against the other end of said hub to throw the latter normally into contact with the disk and a smooth check-wire led from a fixed device over suitable pulleys to the drum, all as and for the purpose set forth.

3. In a checking attachment, the combination with the main framework and wheels, a pair of seed-droppers connected by a cross-shaft, a drum mounted on the framework and having a crank near one extremity of its shaft, and connections between said shaft and the main axle for frictionally rotating the drum; of a lever having one end slotted and engaging said crank, a ratchet-wheel on the cross-shaft, a rod connected with the other end of said lever and having teeth engaging the ratchet-wheel so as to actuate the seed-droppers when the drum rotates in either direction, and a smooth check-wire led from a fixed device over suitable pulleys to the drum, all as and for the purpose set forth.

4. In a checking attachment, the combination with a drum journaled in supports on the main framework, seed-droppers on the latter actuated by the rotation of the drum, and connections between the shaft of the drum and the main drive-wheels for rotating the former from the latter by frictional force; of a wire attached to a fixed device at one side of the field and led over suitable pulleys to the drum so as to be wound thereon as the machine approaches said device and unwound therefrom as the machine recedes, and a spreader for feeding the wire in convolutions side by side onto the drum, substantially as described.

5. In a checking attachment, the combination with a drum journaled in supports on the main framework, seed-droppers on the latter actuated by the rotation of the drum, and connections between the shaft of the drum and the main drive-wheels for rotating the former from the latter by frictional force; of a wire attached to a fixed device at one side of the field and led over suitable pulleys to the drum so as to be wound thereon as the machine approaches said device and unwound therefrom as the machine recedes, and a spreader for feeding the wire in convolutions side by side onto the drum, the same consisting of a pulley pivotally supported upon a disk, guides in which the latter moves transversely of the machine, a screw threaded through the disk, and means for rotating this screw alternately in opposite directions, all substantially as described.

6. In a checking attachment, the combination with the framework carrying the seed-droppers, a drum connected with said droppers, a friction-clutch between the main axle and the shaft of the drum, and a wire leading from a fixed device to the drum; of a pulley-frame projecting laterally from the main framework and carrying two guide-pulleys, bearings on the pulley-frame, a screw journaled therein, a disk threaded on the screw and having a feed-wheel, and means for rotating the screw alternately in opposite directions, as and for the purpose set forth.

7. In a checking attachment, the combination with the framework carrying the seed-droppers, a drum connected with said droppers, a friction-clutch between the main axle and the shaft of the drum, and a wire leading from a fixed device to the drum; of a pulley-frame projecting laterally from the main framework and carrying two guide-pulleys, bearings on the pulley-frame, a screw journaled therein, a disk threaded on the screw and having a feed-wheel, a pivoted lever having a slot at one end, a crank in the shaft of the drum engaging this slot, a rod pivoted to the other end of the lever, oppositely-facing ratchet-wheels on one end of said screw, teeth on the rod adapted to engage either of said wheels, and means for shifting such engagement, as and for the purpose set forth.

8. In a checking attachment, the combination with the framework carrying the seed-droppers, a drum connected with said droppers, a friction-clutch between the main axle and the shaft of the drum, and a wire leading from a fixed device to the drum; of a pulley-frame projecting laterally from the main framework and carrying two guide-pulleys, bearings on the pulley-frame, a screw journaled therein, a disk threaded on the screw and having a feed-wheel, a pivoted lever having a slot at one end, a crank in the shaft of the drum engaging this slot, a rod pivoted to the other end of the lever, oppositely-facing ratchet-wheels on one end of said screw, teeth on the rod adapted to engage either of said wheels, and means for shifting such engagement, said means consisting of a rock-shaft journaled in supports on the main framework and having an upturned foot-piece and a crank, and a rod connected with the crank and having a fork engaging said toothed rod, as and for the purpose set forth.

9. In a checking attachment, the combination with the framework carrying the seed-droppers, a drum connected with said droppers, a friction-clutch between the main axle and the shaft of the drum, and a wire leading from a fixed device to the drum; of the pulley-frame projecting laterally from the main framework and carrying two guide-pulleys, said frame consisting of parallel rods, a disk having two pairs of opposite notches and a radial spindle, a feed-wheel on the latter arranged to feed to the bottom of the drum when one pair of notches engages said rods and to the top of the drum when the other pair of notches is in such engagement, a screw mounted in bearings on the pulley-frame and threaded through the disk, and means for rotating the screw alternately in opposite directions, as and for the purpose set forth.

10. In a checking attachment, the combination with the framework carrying two seed-droppers connected by a cross-shaft, a ratchet-wheel thereon, a drum whose shaft is journaled in a support on the framework and is cranked, frictional connections between said shaft and the main axle, and a check-wire leading from a fixed device over suitable pulleys to the drum; of a centrally-pivoted lever having a slot at one end engaging said crank, a spreader for feeding the incoming wire evenly upon the drum, two rods pivoted to the opposite end of said lever and each having teeth, a ratchet-wheel on said cross-shaft with which one set of teeth engages, and ratchet-wheels on the spreader with which the other set of teeth engages, as and for the purpose set forth.

11. In a checking attachment, the combination with the framework carrying the seed-droppers, a drum connected with said droppers, a friction-clutch between the main axle and the shaft of the drum, and a wire leading from a fixed device to the drum; of a pulley-frame projecting laterally from the main framework and having bearings, a screw journaled therein and having oppositely-facing ratchet-wheels fast on its body, a spreader threaded on the screw, a reciprocating rod having teeth adapted to engage either of said ratchet-wheels, a rock-shaft journaled in supports in the main framework and having an upturned foot-piece and a crank, and a rod connected with the crank and having a fork engaging said toothed rod, as and for the purpose set forth.

12. In a checking attachment, the combination with the framework carrying the seed-droppers, a drum connected with said droppers, a friction-clutch between the main axle and the shaft of the drum, and a wire leading from a fixed device to the drum; of a pulley-frame projecting laterally from the main framework and having bearings, a screw journaled therein and having oppositely-facing ratchet-wheels fast on its body, a spreader threaded on the screw, a reciprocating rod having teeth adapted to engage either of said ratchet-wheels, a rock-shaft journaled in supports in the main framework and having an upturned weighted foot-piece and a crank, a rod connected with the crank and having a fork engaging said toothed rod, and stops on the rod adapted to be engaged by the spreader near the end of its movement along the screw in either direction, as and for the purpose set forth.

13. In a checking attachment, the combination with the framework carrying the seed-droppers, a drum connected with said droppers, a friction-clutch between the main axle and the shaft of the drum, and a wire leading from a fixed device to the drum; of a pulley-frame projecting laterally from the main framework and having bearings, a screw journaled therein and having oppositely-facing ratchet-wheels fast on its body, a spreader threaded on the screw, a reciprocating rod having teeth adapted to engage either of said ratchet-wheels, a rod connected with the crank and having a fork engaging said toothed rod, and stops on the rod sliding on the pulley-frame and adapted to be engaged by the spreader near the end of its movement along the screw in either direction, as and for the purpose set forth.

In testimony whereof I have hereunto subscribed my signature this the 30th day of October, A. D. 1899.

HENRY W. CRUMBAUGH.

Witnesses:
LENARD W. RUSSELL,
JOHN C. ELLER.